May 3, 1927.
F. W. RAUTER
1,627,406
VEHICLE WHEEL
Filed Jan. 29, 1926
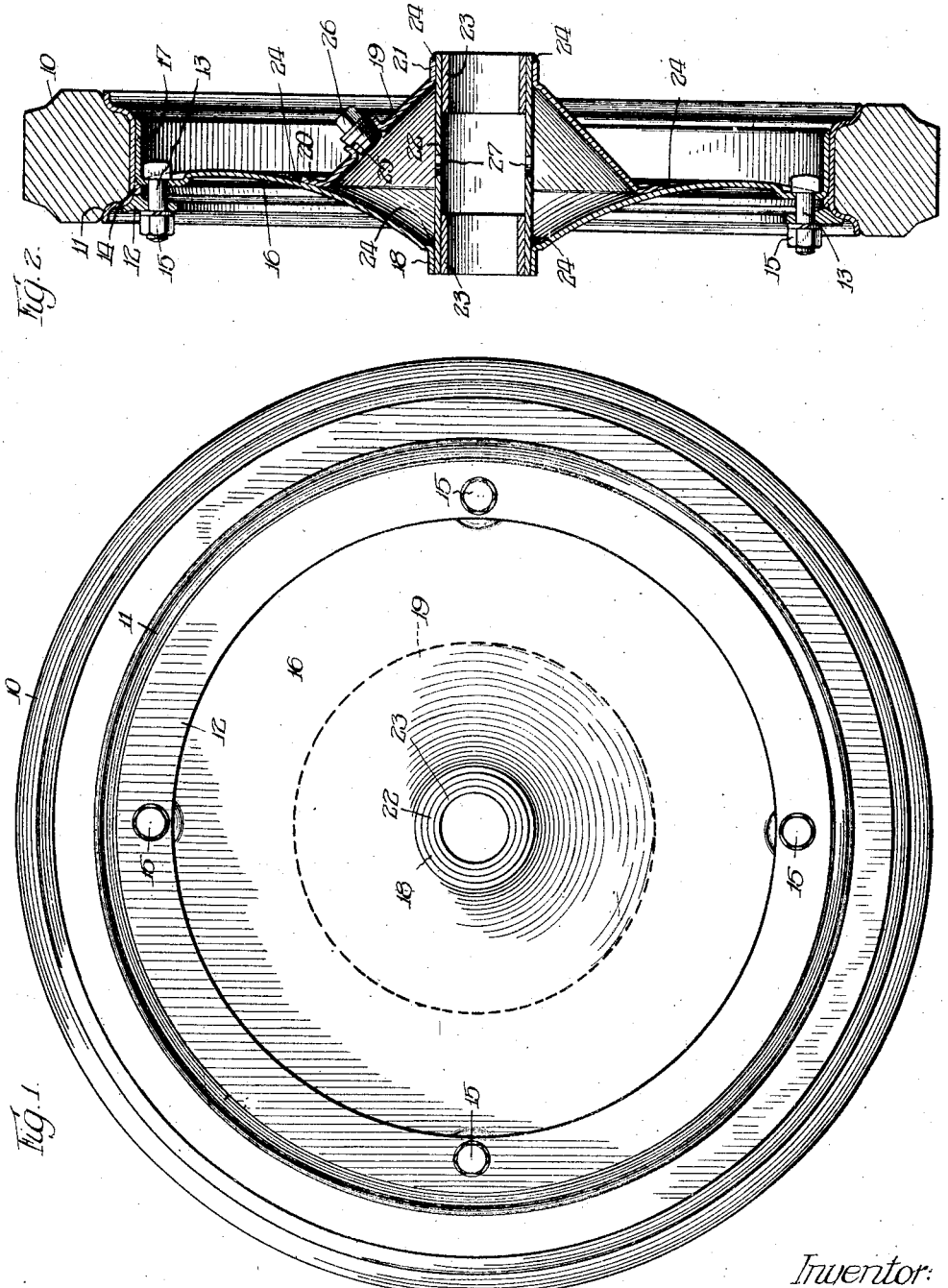
Witness:
R. Burkhardt
Inventor:
Fred W. Rauter,
By Cromwell, Greist & Warden
Attys.

Patented May 3, 1927.

1,627,406

UNITED STATES PATENT OFFICE.

FRED W. RAUTER, OF OSHKOSH, WISCONSIN, ASSIGNOR TO LEACH COMPANY, OF OSHKOSH, WISCONSIN, A CORPORATION OF WISCONSIN.

VEHICLE WHEEL.

Application filed January 29, 1926. Serial No. 84,553.

The invention has to do with vehicle wheels of a type especially adaptable for use in supporting the platforms of portable concrete mixers and the like.

One object of the invention is to provide an improved wheel of the type described which is extremely light, attractive, serviceable and inexpensive.

Another object is to provide such a wheel which is self-lubricating.

Other objects and advantages will be evident upon an understanding of the wheel structure, the invention residing substantially in the novel construction, arrangement and combination of parts incorporated in such structure.

An exemplifying embodiment of the invention is disclosed in the accompanying drawing and following description. The invention is susceptible of embodiment, however, in other modified forms which come equally within the contemplated scope of the appended claims.

In the drawing:

Fig. 1 is a face view of a wheel constructed in accordance with the invention; and Fig. 2 is a section taken diametrically through that wheel.

The wheel illustrated in the drawing is equipped with a solid rubber tire 10 which is seated in the channel provided by a rim 11. The rim 11 is demountably associated with the felly portion of the wheel body by means of a retaining ring 12, which ring is apertured at circumferentially spaced intervals and fits over a number of similarly arranged bolts 13 protruding from the felly portion, the ring being adjustably positioned outwardly of the bolts against an annular bead 14 on the inside of the rim by nuts 15 on the bolts.

The wheel body consists of a disc 16 which is provided with a rearwardly extending peripheral flange 17 upon which the rim 11 is seated. The disc 16 extends inwardly from the flange 17 in a gradual curve toward the front of the wheel, and terminates in a forwardly extending cylindrical flange 18. The disc 16 is engaged at an intermediate point on its rear face by another considerably smaller disc 19, and the smaller reinforcing disc is provided with a peripheral flange 20 which is welded contiguously against the disc 16. The disc 19 extends inwardly and rearwardly from the flange 20, and terminates, like the disc 16, in a rearwardly extending cylindrical flange 21. The two oppositely disposed flanges 18 and 21 are welded to a cylindrical sleeve 22 adjacent the ends thereof, and two shorter cylindrical sleeves 23 are in turn welded within the ends of the sleeve 22. The sleeves 23 are adapted to be journalled on the usual cylindrical axle.

The connections between the disks 16 and 19 and the sleeve 22 may advantageously be effected by the application of filler material in a welding operation, the filler 24 being applied to the front disk at the rear thereof between the disk and the sleeve, to the rear disk at the rear thereof between that disk and the sleeve, in a space provided by terminating the flange 21 a little short of the rear end of the sleeve 22, and to both of the discs about the outer periphery of the flange 20.

The annular chamber of triangular cross section formed between the discs 16 and 19 and the sleeve 22, constitutes a reservoir for lubricant. The lubricant is fed into the reservoir at the rear of the wheel through an aperture 25 in the disc 16, which aperture is normally closed by a screw plug 26, and leaves the reservoir gradually through a number of small apertures 27 in the sleeve 22, filling the shallow annular space between the sleeve 22, the sleeves 23 and the axle, and working out in a thin film over the axle beneath the sleeves 23.

I claim:

1. In a vehicle wheel, a front sheet metal disk, a rear sheet metal disk peripherally welded to and centrally spaced from the front disk, a cylindrical sheet metal sleeve to which the disks are centrally welded, a normally closed inlet in the rear disk to permit the introduction of a lubricant into the chamber formed between the front and rear disks and the sleeve, and one or more apertures in the sleeve to permit the lubricant in the chamber to flow from the same onto an axle encompassed by the sleeve.

2. In a vehicle wheel, a front disc having an inwardly and forwardly extending central portion which terminates in a forwardly extending cylindrical flange, a rear disc secured to the front disc and having an inwardly and rearwardly extending central portion which terminates in a rearwardly extending flange, and a cylindrical sleeve secured to the flanges of both discs.

3. In a vehicle wheel, a front disc having an inwardly and forwardly extending central portion, a rear disc of smaller size secured to the front disc and having an inwardly and rearwardly extending central portion, a sleeve secured to the innermost extremities of the central portions of both discs, welding filler applied rearwardly of the front disc at the junction between that disc and the sleeve, and other welding filler applied rearwardly of the rear disc at the junction between that disc and the sleeve.

4. In a vehicle wheel, a front disc having an inwardly and forwardly extending central portion, a rear disc of smaller size secured to the front disc and having an inwardly and rearwardly extending central portion, a sleeve secured to the innermost extremities of the central portions of both discs, welding filler applied rearwardly of the front disc at the junction between that disc and the sleeve, and other welding filler applied rearwardly of the rear disc at the junction between that disc and the sleeve, said rear disc terminating short of the rear end of the sleeve to provide space for the reception of the filler on the periphery of the sleeve.

5. In a vehicle wheel, a front disc having an inwardly and forwardly extending central portion, a rear disc of smaller size secured to the front disc and having an inwardly and rearwardly extending central portion, a sleeve secured to the innermost extremities of the central portions of both discs, and two smaller sleeves secured within the first mentioned sleeve inwardly of the extremities of the central portions of the discs.

6. In a vehicle wheel, a front disc having an inwardly and forwardly extending central portion, a rear disc of smaller size secured to the front disc and having an inwardly and rearwardly extending central portion, a sleeve secured to the innermost extremities of the central portions of both discs, a normally closed inlet in the rear disc to permit the introduction of a lubricant into the chamber formed between the discs and the sleeve, and one or more outlets in the sleeve to permit the discharge of the lubricant onto an axle encompassed by the sleeve.

In testimony whereof I have hereunto subscribed my name.

FRED W. RAUTER